United States Patent
Dalbard

Patent Number: 5,795,010
Date of Patent: Aug. 18, 1998

[54] SUNVISOR PROVIDED WITH MEANS FOR AUTOMATICALLY RETURNING THE PANEL TO A STABLE POSITION

[75] Inventor: Benoît Dalbard, Mirecourt, France

[73] Assignee: Rockwell BCS-France, Mirecourt, France

[21] Appl. No.: 695,002

[22] Filed: Aug. 9, 1996

[30] Foreign Application Priority Data

Aug. 18, 1995 [FR] France .................... 95 09912

[51] Int. Cl.$^6$ ........................ B60J 1/02
[52] U.S. Cl. ........................ 296/97.13
[58] Field of Search .............. 296/97.9, 97.12, 296/97.13; 224/312

[56] References Cited

U.S. PATENT DOCUMENTS

| | | | |
|---|---|---|---|
| 2,304,223 | 12/1942 | Westrope | 287/108 |
| 2,458,677 | 1/1949 | Brundage | 296/97 |
| 4,070,054 | 1/1978 | Cziptschirsch | 296/97 K |
| 4,500,131 | 2/1985 | Fleming | 296/97.12 |
| 5,139,303 | 8/1992 | Miller | 296/97.9 |
| 5,364,149 | 11/1994 | Avmerich et al. | 296/97.12 |
| 5,383,700 | 1/1995 | Agro et al. | 296/97.9 |

FOREIGN PATENT DOCUMENTS

| | | |
|---|---|---|
| A-525143 | 2/1993 | European Pat. Off. . |
| B-2551633 | 5/1977 | Germany . |
| C-4104032 | 4/1992 | Germany . |

*Primary Examiner*—Stephen Avila
*Attorney, Agent, or Firm*—Wolf, Greenfield & Sacks, P.C.

[57] ABSTRACT

The invention relates to a sunvisor provided with means for automatically returning the panel to a pressed-down position, in particular the position where it is pressed down against the roof of the vehicle. The panel is hinged on a bent arm mounted to the roof of the vehicle. The return means covers a range of return angles B which includes the angular position A of the panel in which the component of the impact force from the impact standards test sphere lies in the mid plane of the panel. Angle B preferably lies in the range 50° to 60°.

1 Claim, 2 Drawing Sheets

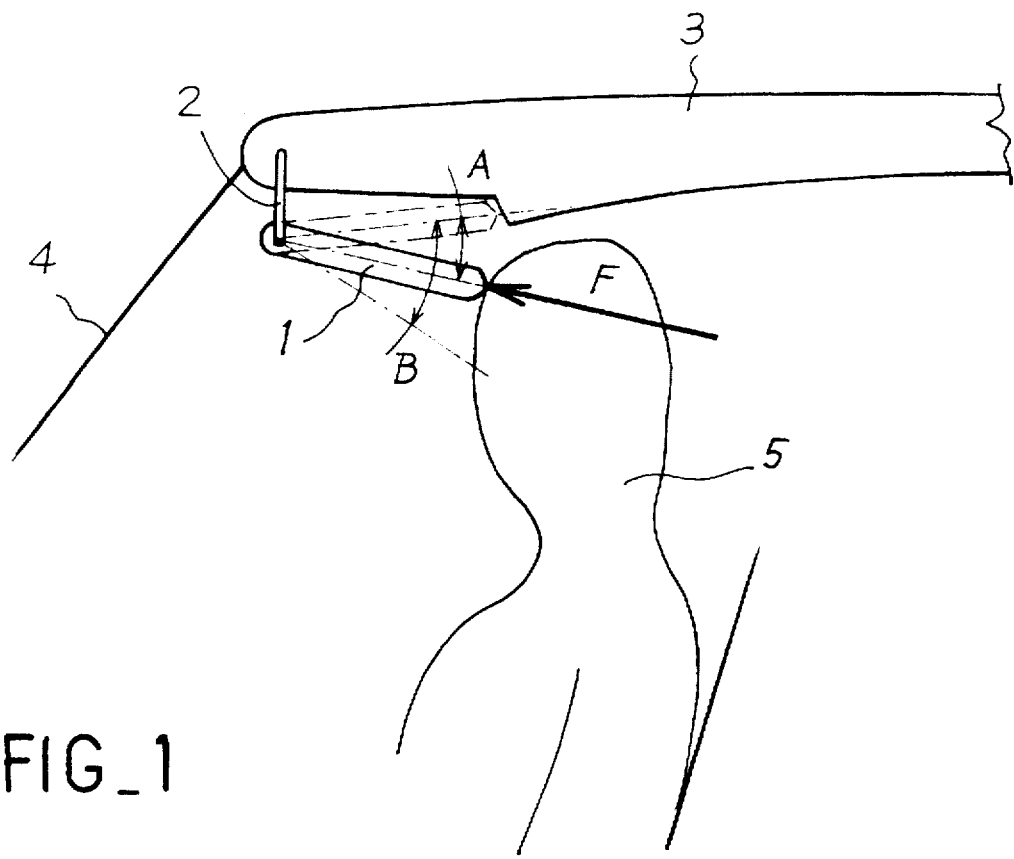
FIG_1
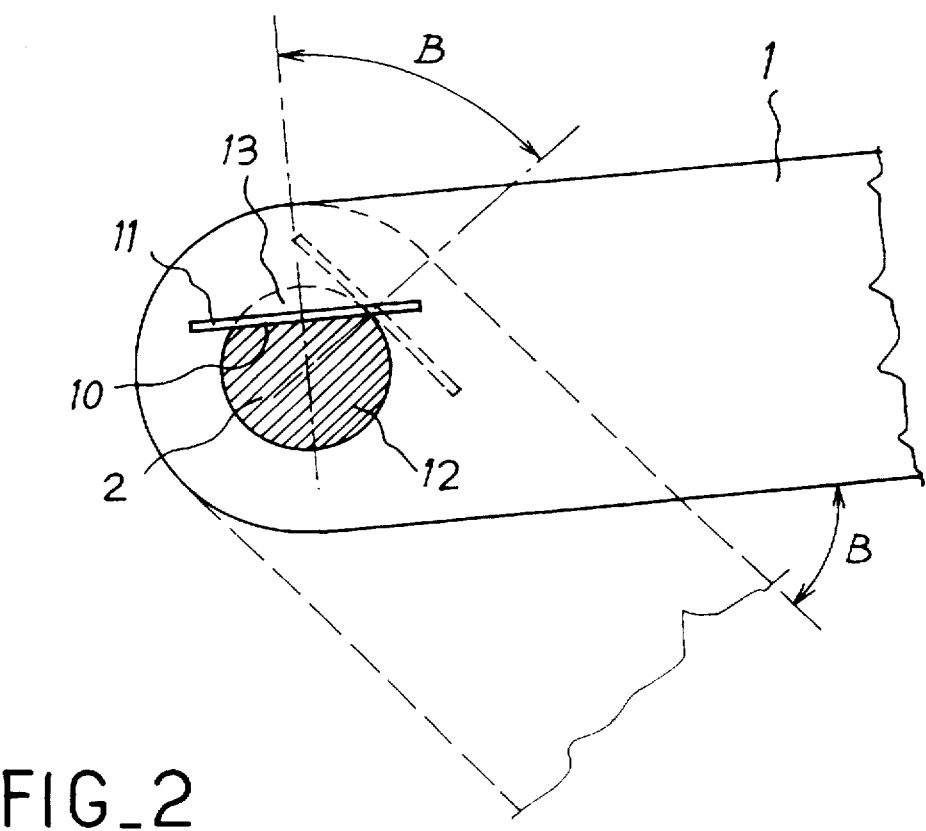
FIG_2

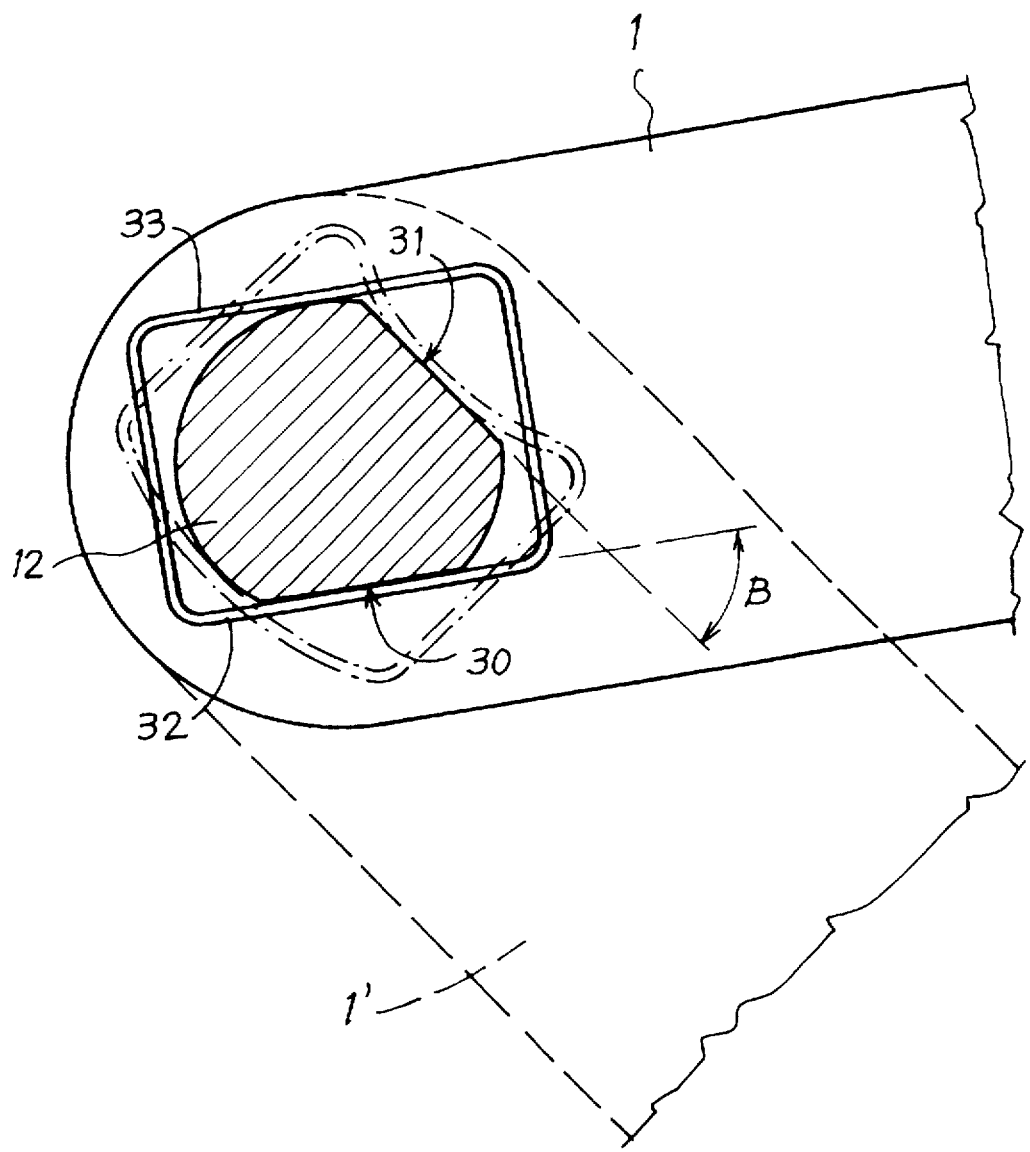
FIG_3

SUNVISOR PROVIDED WITH MEANS FOR AUTOMATICALLY RETURNING THE PANEL TO A STABLE POSITION

The present invention relates to a sunvisor for the cabin of a motor vehicle, said sunvisor comprising a rigid panel hinged on a bent arm designed to be mounted to the roof of the vehicle, and means effective when the panel is positioned in a range of angles adjacent to at least one stable position relative to said arm for allowing the panel to return automatically to said stable position(s), in particular the position in which the panel is pressed down against the roof of the vehicle.

BACKGROUND OF THE INVENTION

Said means generally include at least one flat provided on the arm and which cooperates with a spring element secured to the panel, in order to return the panel positively to its pressed-down position against the roof, and hold it there. The range of angles over which return is automatic is relatively small.

Outside said range of angles, the panel is held by friction in the position chosen by the user. This happens in particular when the panel is lowered only a little relative to the horizontal, and is positioned in an angular position such that in the event of an accident, impact with the occupant occurs right on the edge of the panel. Under such circumstances, the resistance of the sunvisor is at its maximum. Said resistance is measured by a sphere referred to as "the impact standards test sphere". Motor vehicle safety considerations require that possible causes of injury in the event of an accident should be reduced as much as possible.

The state of the art is illustrated by U.S. Pat. No. 5,383,700, U.S. Pat. No. 2,304,223, U.S. Pat. No. 2,458,877, U.S. Pat. No. 5,364,149, U.S. Pat. No. 4,070,054, U.S. Pat. No. 5,139,303, and DE-C-41 04 032.

OBJECT AND SUMMARY OF THE INVENTION

The object of the present invention is to propose a sunvisor of the type mentioned which cannot remain stably in the critical position where the component of the impact force from the impact standards test sphere lies in the mid plane of the panel.

According to the invention, this object is achieved by the fact that the automatic return means covers a range of return angles which includes the angular position of the panel in which the component of the impact force from the impact standards test sphere lies in the mid plane of the panel.

In order to do this, the arm includes a flat which cooperates with a spring element secured to the panel. The depth of the notch provided in the arm and defined by said flat is such that the extent of the range of angles on either side of the stable position is greater than 45°. Said extent preferably lies in the range 50° to 60°.

With this disposition, on the sunvisor's stroke towards the roof, the spring element comes into contact with the flat sooner than in current dispositions. Conversely, in use, the panel requires the user to move it through a greater angle before reaching a first static operating position.

In a second embodiment of the invention, the arm includes two converging flats suitable for cooperating respectively with two spring elements secured to the panel, in order to define two stable positions on either side of the angular position of the panel in which the component of the impact force from the impact standards test sphere lies in the mid plane of the panel. In this case, the two flats and the two spring elements are disposed in such a way that if the panel is positioned between the two stable positions it will automatically return to one or other of the stable positions.

As a result of said disposition, the occupant of the vehicle fitted with the sunvisor of the invention is not exposed to the sharp edges of said sunvisor in the event of an accident.

BRIEF DESCRIPTION OF THE DRAWINGS

Other advantages and characteristics of the invention appear on reading the following description given by way of example and with reference to the accompanying drawings, in which:

FIG. 1 shows the critical position of a sunvisor mounted in the cabin of a motor vehicle;

FIG. 2 shows a first embodiment of the sunvisor of the invention in a cross-section perpendicular to the hinge axis of the panel; and FIG. 3 shows a second embodiment of the sunvisor of the invention according to a second embodiment.

MORE DETAILED DESCRIPTION

In FIG. 1, reference 1 represents a sunvisor panel, hinged on a bent arm 2 which is mounted to the roof 3 of a motor vehicle by means of a seating. The hinging of the panel 1 on the hinge pin of the arm 2 includes means for holding the panel 1 in a position pressed down against the roof 3, as shown by chain-dotted lines in FIG. 1. On the same figure, the critical position of the panel 1 is shown in solid lines, with the panel 1 making an angle A relative to the pressed-down position. In said critical position, the force F which would result from the impact of the head 5 of a passenger in the event of an accident lies in the mid plane of the panel 1. The head 5 of the passenger thus strikes the sharp edge of the panel 1, and unfortunately when the panel 1 is in said critical position its resistance to impact is at its greatest. The object of the present invention is to ensure that when the panel 1 is in said critical position, it is automatically returned to a stable position which may coincide with the pressed-down position against the roof 3, or which may make an angle B with said pressed-down position 6, where the angle B is much greater than the critical angle A.

In a first embodiment of the sunvisor of the invention, as shown in FIG. 2, the arm 2 includes a flat 10 which, when the panel is pressed down against the roof 3, cooperates with a spring element 11 secured to the panel 1, said position being shown by solid lines in FIG. 2. As can be seen in said FIG. 2, the hinge pin 12 of the panel 1 is substantially circular and includes a relatively deep notch 13 defined by the flat 10. As a result of said disposition, the panel 1 automatically returns to the pressed-down position against the roof 3 when the angle between the panel 1 and the pressed-down position is less than angle B shown in FIG. 2. The depth of the notch 13 is calculated so that angle B is considerably greater than angle A defined in FIG. 1. Angle B is preferably greater than 45°, and it advantageously lies in the range 50° to 60°. In FIG. 2, the angular position of the panel 1 corresponding to angle B is shown by dashed lines.

In said position, the spring element 11 is under tension and bears against the cylindrical wall of the pin 12, in order to hold the panel 1 relative to the arm 2 by friction for any position that the panel may take up providing it is at an angle relative to the pressed-down position against the roof 3 that is greater than the angle B.

The extent of angle B corresponds to a range of angles in which the panel 1 automatically returns to the stable position which corresponds to the pressed-down position of the panel 1 against the roof 3 of the vehicle.

In a second embodiment of the invention shown in FIG. 3, the hinge pin 12 of the panel 1 presents two converging flats 30 and 31, which can cooperate respectively with two parallel spring elements 32 and 33 secured to the panel 1. The two flats 30 and 31 are situated in planes which intersect at an angle B which is greater than 45°, and which preferably lies in the range 50° to 60°. The panel 1 can thus be placed in two stable positions, the first corresponding to the pressed-down position against the roof 3 of the vehicle and shown by solid lines in FIG. 3, and the second corresponding to a lower position making an angle B with the pressed-down position. In any intermediate position between said two extreme stable positions, the panel 1 is automatically returned to one or other of said stable positions.

I claim:

1. A sunvisor for the cabin of a motor vehicle, said sunvisor comprising a rigid panel hinged on a bent arm designed to be mounted to the roof of the vehicle, and means effective when the panel is positioned in a range of angles adjacent to two stable positions relative to said arm for allowing the panel to return automatically to said stable positions, one of which is a position in which the panel is pressed down against the roof of the vehicle, wherein the arm includes two converging flats, each capable of cooperating with a respective, associated spring element secured to the panel in order to constitute said return means, and wherein the range of angles on at least one side of each stable position is greater than 45°, as a result of which said two flats and associated spring elements define two stable positions on either side of an angular position of the panel in which the component of the impact force from the impact standards test sphere lies in the mid plane of the panel, said flats and said spring elements being disposed in such a way that if the panel is positioned between the two stable positions the panel will return automatically to the one or the other of the stable positions.

* * * * *